Aug. 16, 1932.  R. L. DERRYBERRY ET AL  1,872,073
BRAKE TESTING APPARATUS
Filed Nov. 12, 1931  2 Sheets-Sheet 1
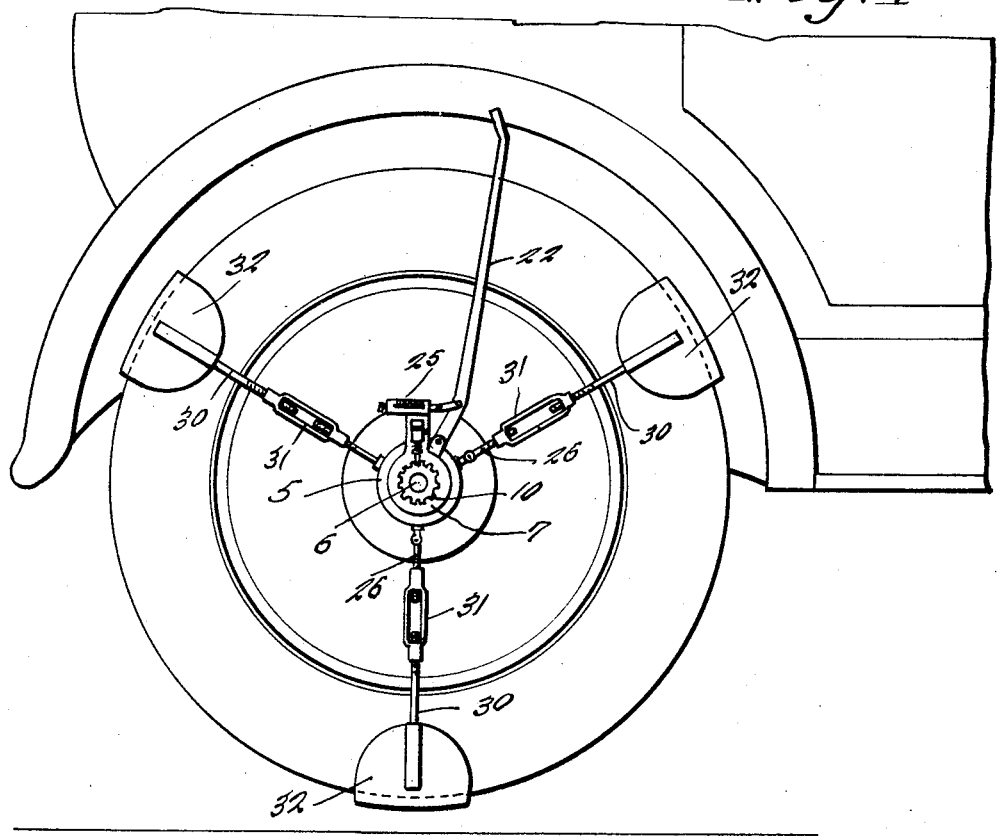
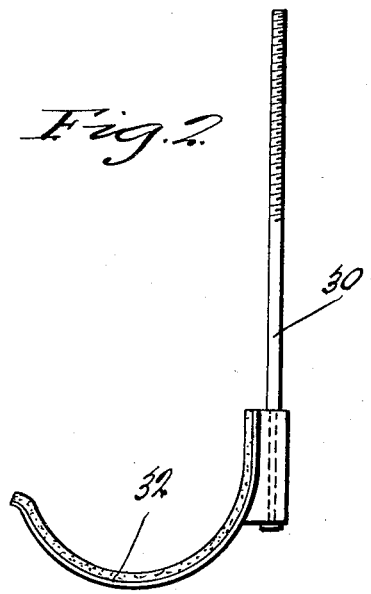
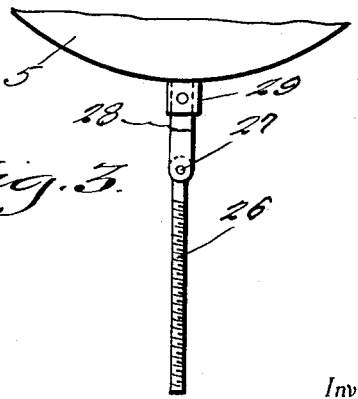
Inventor
R. L. Derryberry
J. E. Johnson
By Clarence A. O'Brien
Attorney

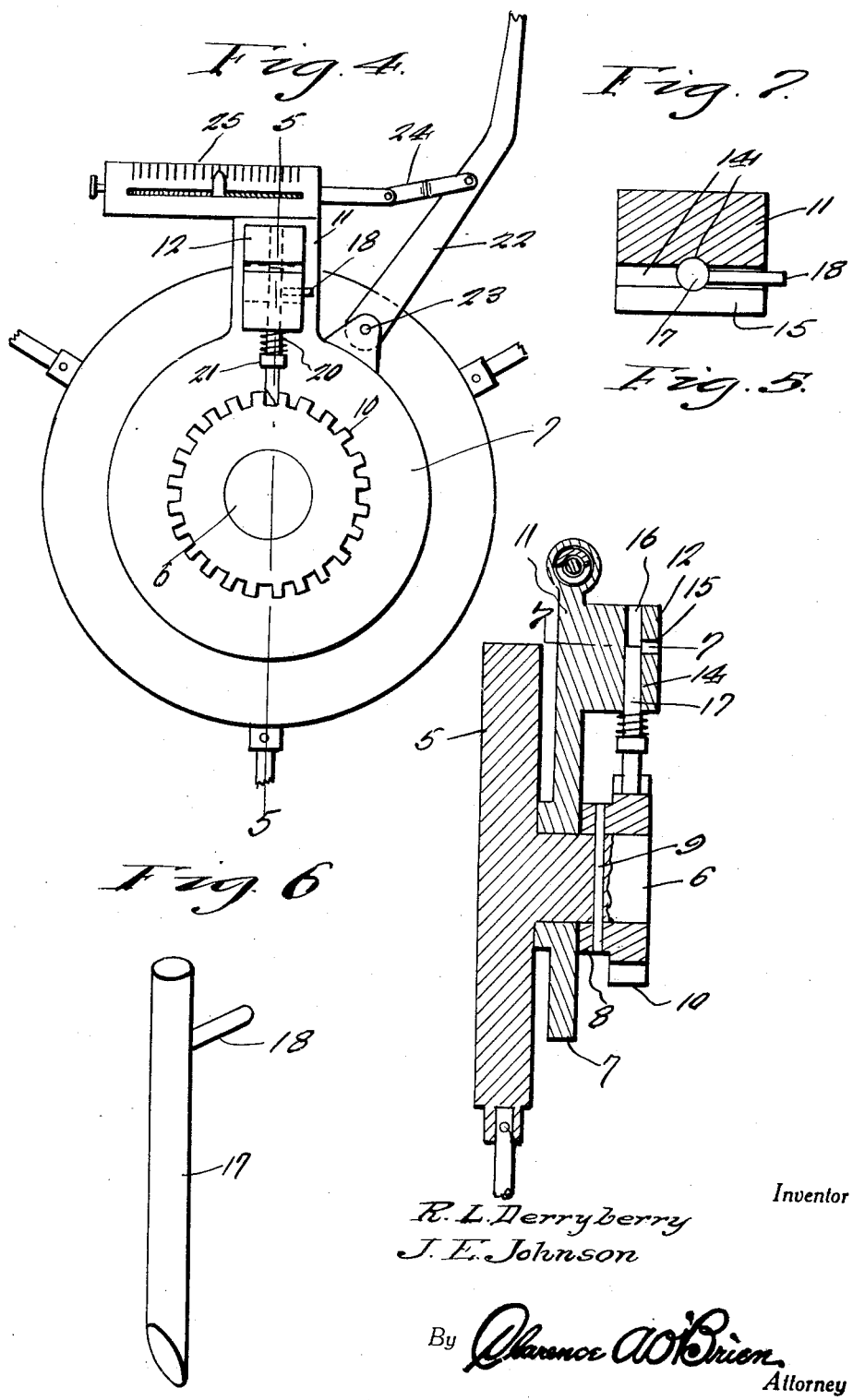

Patented Aug. 16, 1932

1,872,073

UNITED STATES PATENT OFFICE

ROMULUS L. DERRYBERRY AND JOSEPH E. JOHNSON, OF STONE, KENTUCKY

BRAKE TESTING APPARATUS

Application filed November 12, 1931. Serial No. 574,651.

This invention relates to an apparatus for testing the brakes of automobiles having for its prime object to provide a hand operated apparatus whereby the four wheels of an automobile may be easily tested for the efficiency of their brakes.

Another very important object of the invention resides in the provision of an apparatus of this nature which is simple in its construction, inexpensive to manufacture, strong and durable, easy to handle, thoroughly efficient and reliable in use and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the apparatus on the wheel of an automobile.

Figure 2 is a detail elevation of one of the grips.

Figure 3 is a detail view of one of the bars engaged on a disk.

Figure 4 is an enlarged side elevation of the central portion of the apparatus.

Figure 5 is a sectional view therethrough taken substantially on the line 5—5 of Figure 4.

Figure 6 is a perspective view of the pawl, and

Figure 7 is a detail section taken substantially on the line 7—7 of Figure 5.

Referring to the drawings in detail it will be seen that numeral 5 denotes a disk with a trunnion 6 projecting laterally and centrally therefrom. A disk 7 is rockable on the trunnion 6. A sleeve 8 is pinned or otherwise fixed as at 9 to the trunnion 6 and has an annular series of rack teeth 10 projecting therefrom. Numeral 11 denotes a radial extension of the disk 7 formed with a lateral block 12 in which is a slot 14 extending transversely thereof opening through the sides as illustrated in Figure 5 and through the front as indicated at 15 and a bore 16 extends from the top through the bottom of the block and a portion of the bore coincides with a portion of the slot 14.

A pawl 17 is slidable and rockable in the bore 16 and has a handle 18 extending laterally from an intermediate portion thereof to extend out through the sides of the slot 14 so that the lower end of the pawl may be reversed. The pawl is normally urged downwardly by a spring 20 impinging against the bottom of the block and against shoulder 21 on the pin so that the beveled end engages with the teeth 10.

A lever 22 is rockable as at 23 on the disk 7 adjacent the extension 11 and has a link connection 24 with a spring gage 25 of suitable construction.

A plurality of rods 26 are rockably engaged as at 27 with pins 28 fixed in sockets 29 radiating from the periphery of the disk 5. A plurality of rods 30 have threads opposite to those of the rods 26 and turn buckles 31 connect the rods 26 with the rods 30. Padded jaws 32 are mounted on the outer ends of the rods 30 to fit over a tire as is indicated to advantage in Figure 1 and then the turn buckles are tightened to properly center the disk 51 with respect to the wheel and securely fasten the device on the wheel.

Then by rocking the lever 22 with the brakes set, it will be seen that the wheel will be turned when the gage 25 registers the pressure necessary to turn the wheel against the set brakes.

It is thought that the construction, operation, utility and advantages of this invention will now be quite apparent to those skilled in this art without a more detailed description thereof.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. In combination, a brake testing device, including a plurality of rods, a second plurality of rods, the first plurality having oppositely threaded portions to the second mentioned and turn buckles connecting the first mentioned plurality with the second mentioned plurality of rods, and tire engaging jaws on the second mentioned plurality of rods, a disk from which the first plurality of rods extend, said disk being formed with a trunnion, a disk rockable on the trunnion, a pawl mounted in the second disk to engage rack teeth about the trunnion, means for mounting the rack teeth on the trunnion, a force measuring gage on the second disk, a lever rockable on the second disk, and means for connecting the lever with the gage.

2. In combination, a brake testing device, including a plurality of rods, a second plurality of rods, the first plurality having oppositely threaded portions to the second mentioned and turn buckles connecting the first mentioned plurality with the second mentioned plurality of rods, and tire engaging jaws on the second mentioned plurality of rods, a disk from which the first plurality of rods extend, said disk being formed with a trunnion, a disk rockable on the trunnion, a pawl mounted in the second disk to engage rack teeth about the trunnion, means for mounting the rack teeth on the trunnion, a force measuring gage on the second disk, a lever rockable on the second disk, and means for connecting the lever with the gage, means whereby the pawl may be reversed.

In testimony whereof we affix our signatures.

ROMULUS L. DERRYBERRY.
JOSEPH E. JOHNSON.